US009437170B1

(12) United States Patent
Quevedo Montesdeoca

(10) Patent No.: US 9,437,170 B1
(45) Date of Patent: Sep. 6, 2016

(54) SYSTEMS AND METHODS FOR AUGMENTED REALITY DISPLAY

(71) Applicant: Roberto Quevedo Montesdeoca, Teror (ES)

(72) Inventor: Roberto Quevedo Montesdeoca, Teror (ES)

( * ) Notice: Subject to any disclaimer, the term of this patent is extended or adjusted under 35 U.S.C. 154(b) by 205 days.

(21) Appl. No.: 13/964,442

(22) Filed: Aug. 12, 2013

(51) Int. Cl.
*G09G 5/377* (2006.01)
(52) U.S. Cl.
CPC ...................... *G09G 5/377* (2013.01)
(58) Field of Classification Search
None
See application file for complete search history.

(56) References Cited

U.S. PATENT DOCUMENTS

| 6,861,061 | B2* | 3/2005 | Maxon | A61K 8/06 424/400 |
| 7,933,395 | B1* | 4/2011 | Bailly | G06F 3/04815 379/201.04 |
| 2004/0181340 | A1* | 9/2004 | Smith | G08B 21/10 702/3 |
| 2006/0241860 | A1* | 10/2006 | Kimchi | G01C 21/26 701/532 |
| 2011/0279453 | A1* | 11/2011 | Murphy | G06T 13/00 345/420 |
| 2012/0075168 | A1* | 3/2012 | Osterhout | G02B 27/017 345/8 |
| 2012/0092373 | A1* | 4/2012 | Ryu | G06T 19/006 345/633 |

OTHER PUBLICATIONS

NASA "Real-Time Land Information System", downloaded @ http://web.archive.org/web/20120606122407/http://weather.msfc.nasa.gov/sport/modeling/lis.html available online before Jun. 6, 2012.*

Sullivan et al. "A grid Nesting Method for Large-eddy Simulation of Planetary Boundary-Layer Flows", Boundary-Layer Meteorology 80: 167-202, 1996.*

* cited by examiner

*Primary Examiner* — Yingchun He
(74) *Attorney, Agent, or Firm* — Michael David, Esq.; Capitol City Tech Law

(57) ABSTRACT

Systems and methods for generating Augmented Reality displays including obtaining a location and an orientation of an electronic device. Geolocation responsive to the location and the orientation of the electronic device and a distance may be obtained. Physical phenomena information of the geolocation may be obtained. The physical phenomena information may be displayed overlaying a view of a physical environment on a display of the electronic device.

15 Claims, 12 Drawing Sheets

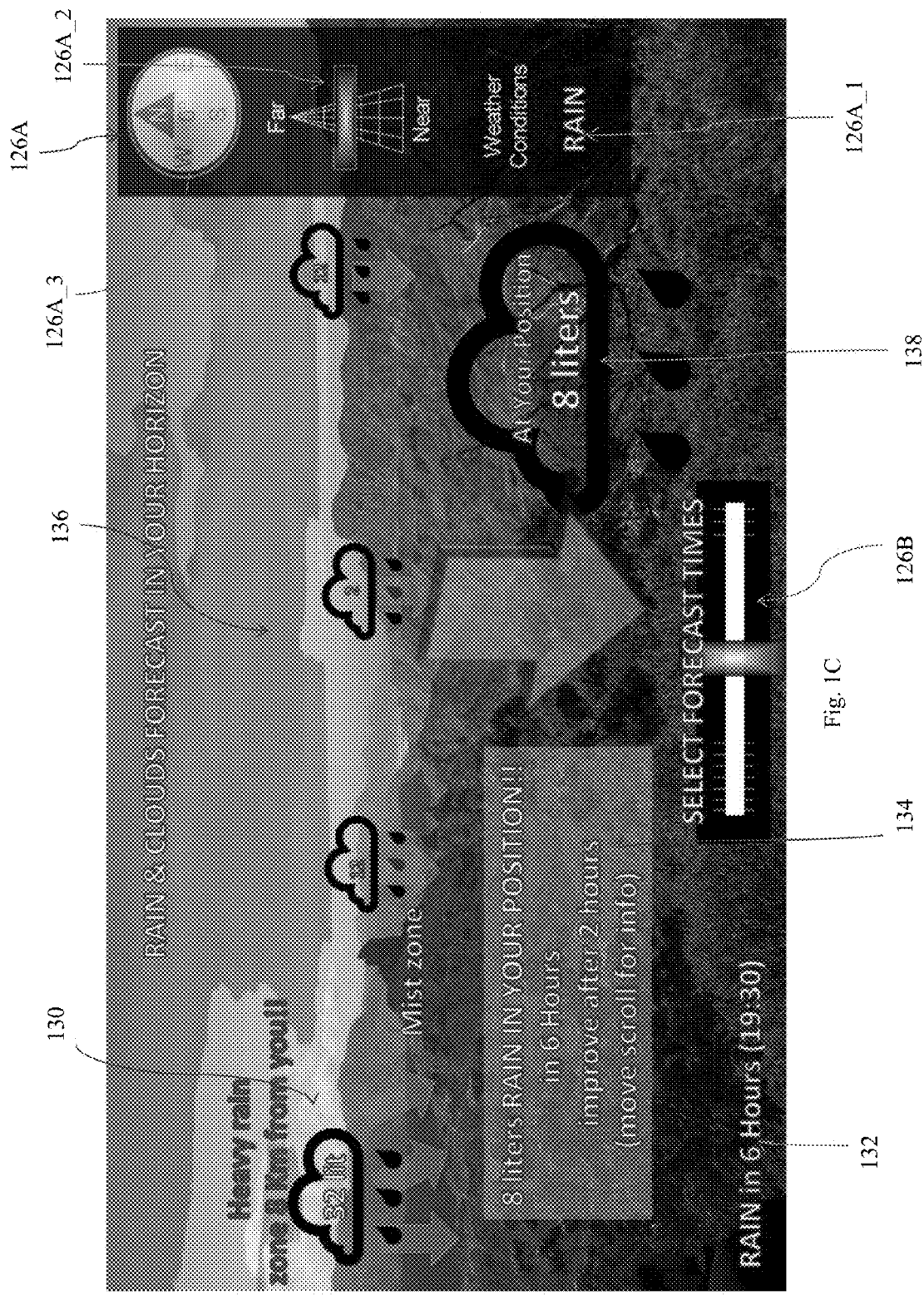

SYSTEMS AND METHODS FOR AUGMENTED REALITY DISPLAY

BACKGROUND

The present disclosure relates generally to augmented reality applications. The present disclosure more specifically relates to providing physical phenomena information in Augmented Reality ("AR"), overlaying the physical phenomena information on a view of a physical environment captured by a user device.

In 1901, L. Frank Baum, an author, first mentions the idea of an electronic display/spectacles that overlays data onto real life (in that case 'people'). It is called a 'character marker'. In 1990, Boeing researcher Tom Caudell first coined the term "augmented reality" to describe a digital display used by aircraft electricians that blended virtual graphics onto a physical reality.

AR is a live, direct or indirect, view of a physical, real-world environment whose elements are augmented (or supplemented) by computer-generated imagery. Information about the real world physical environment can be obtained and displayed as an information layer which can be overlaid on the live view and interacted with by a user. Despite strong potential and interest in AR systems, AR systems for physical phenomena information that provide accuracy and customization (systems respond to one or more parameters) have not been generally available.

SUMMARY

Implementation of the systems and methods for obtaining and displaying physical phenomena information are described herein. The present invention discloses putting geolocation based physical phenomena information annotations on the screen, based on where a device is, which direction it is pointed at, and how far it is from place marks of interest.

Annotations of all place marks situated within the visible area will be overlaid on the device screen. Furthermore, such annotations should be updated every time there is a change in the user location, a rotation of the device is produced, or when a change in the radius of the region of interest takes place.

One implementation is a computerized method for augmented reality. The method includes obtaining a location and an orientation of an electronic device. The method also includes obtaining a geolocation responsive to the location and the orientation of the electronic device and a distance. The method further includes obtaining physical phenomena information of the geolocation. The method additionally includes displaying the physical phenomena information overlaying a view of a physical environment on a display of the electronic device.

Another implementation is a system for augmented reality. The system includes one or more processing circuits operable to obtain a location and an orientation of an electronic device. The one or more processing circuits are also operable to obtain a geolocation responsive to the location and the orientation of the electronic device and a distance. The one or more processing circuits are further operable to obtain physical phenomena information of the geolocation. The one or more processing circuits are additionally operable to display the physical phenomena information overlaying a view of a physical environment on a display of the electronic device.

A further implementation is a non-transitory computer-readable medium having machine instructions stored therein, the instructions being executable by one or more processors to cause the one or more processors to perform operations. The operations include obtaining a location and an orientation of an electronic device. The operations also include obtaining a geolocation responsive to the location and a distance from a target location or a location of interest. The operations further include obtaining physical phenomena information of the geolocation. The operations additionally include displaying the physical phenomena information overlaying a view of a physical environment on a display of the electronic device.

For example, one embodiment provides a computerized method for generating Augmented Reality displays, comprising: obtaining a location and an orientation of an electronic device;

obtaining a geolocation responsive to the location and the orientation of the electronic device and a distance;

obtaining physical phenomena information of the geolocation; and displaying the physical phenomena information overlaying a view of a physical environment on a display of the electronic device. The method generates the physical phenomena information responsive to one or more parameters. The one or more parameters further comprises: a time parameter, a distance parameter or a combination thereof.

In a preferred embodiment, the physical phenomena information comprises weather forecast information, more preferably the method displays a cloud forecast, wind forecast, rain forecast, snow forecast, sun light forecast, temperature forecast, humidity forecast, mist forecast, helicity forecast, relative storm helicity forecast, convective available potential energy forecast, dew point forecast, air pressure forecast or a combination thereof. The method can further comprise of:

obtaining weather information corresponding to different areas within the area covered by the location, the orientation of the device and the distance; and displaying the weather information at relative positions over the view of the physical environment on the device.

In a particular embodiment, the method displays a rendering a cloud forecast and displays a rendering of a cloud. And preferably, the rendering comprises shape of the cloud, location of the cloud, or a combination thereof.

In an alternative embodiment, the physical phenomena information comprises oceanic information. The oceanic information may comprise current, water temperature, salinity, vorticity, dissolved oxygen, wave height, biomass, phosphate, dynamic depth anomaly, nitrate or a combination thereof.

In another embodiment, the physical phenomena information comprises geological information. The geological information may comprise earthquake information, $CO_2$ gas measure, $SO_2$ gas measure, Helium measure, faults information, mineral water prospections, natural or artificial galleries and petrol, mineral, mineral fossil prospections. That may include the location of an earthquake epicenter, movements of the earthquake epicenter, location of $CO_2$ gas measure, $SO_2$ gas measure, Helium measure, faults, mineral water prospections, and petrol, mineral, mineral fossil deposits, or a combination thereof.

In yet another embodiment, the physical phenomena information comprises Planetary Science information.

In accordance with another aspect, the invention provides a system for generating Augmented Reality displays comprising one or more processing circuits operable to:

obtain a location and an orientation of an electronic device;

obtain a geolocation responsive to the location and the orientation of the electronic device and a distance;

obtain physical phenomena information of the geolocation; and display the physical phenomena information overlaying a view of a physical environment on a display of the electronic device. In one embodiment, the one or more processing circuits are operable to generate the information responsive to one or more parameters. The one or more parameters may further comprise: a time parameter, a distance parameter or a combination thereof.

In another embodiment, the physical phenomena information comprises weather forecast information. The system may displays cloud forecast, wind forecast, rain forecast, snow forecast, sun light forecast, temperature forecast, humidity forecast, mist forecast, helicity forecast, relative storm helicity forecast, convective available potential energy forecast, dew point forecast, air pressure forecast, or a combination thereof. The processing circuits may further comprise:

obtaining different weather information corresponding to different areas within the area covered by the location, the orientation of the device and the distance; and displaying the weather information at relative positions over the view of the physical environment on the device.

In one embodiment, the one or more processing circuits are operable to display a rendering of cloud and the rendering may comprise the shape of the cloud, location of the cloud, or a combination thereof.

In another embodiment, the physical phenomena information comprises oceanic information. The oceanic information comprises current, water temperature, salinity, vorticity, dissolved oxygen, wave height, biomass, phosphate, dynamic depth anomaly, nitrate, or a combination thereof.

In another embodiment, the physical phenomena information comprises geological information. The geological information may comprise earthquake information, $CO_2$ gas measure, $SO_2$ gas measure, Helium measure, faults information, mineral water prospections, natural or artificial galleries and petrol, mineral, mineral fossil prospections information. It may comprise the location of an earthquake epicenter, movements of the earthquake epicenter, location of $CO_2$ gas measure, $SO_2$ gas measure, Helium measure, faults, mineral water prospections, and petrol, mineral, mineral fossil deposits, or a combination thereof.

Alternatively, the physical phenomena information comprises Planetary Science information.

In another aspect, the invention provides a non-transitory computer-readable medium having machine instructions stored therein, the instructions being executable by one or more processors to cause the one or more processors to perform operations comprising:

obtaining a location and an orientation of an electronic device;

obtaining a geolocation responsive to the location and the orientation of the electronic device and a distance;

obtaining physical phenomena information of the geolocation; and displaying the physical phenomena information overlaying a view of a physical environment on a display of the electronic device. The operations may include generating the information responsive to one or more parameters. The one or more parameters further comprises: a time parameter, a distance parameter or a combination thereof.

In one embodiment, the physical phenomena information comprises weather forecast information. The weather forecast operations may include displaying a cloud forecast, wind forecast, rain forecast, snow forecast, sun light forecast, temperature forecast, humidity forecast, mist forecast, helicity forecast, relative storm helicity forecast, convective available potential energy forecast, dew point forecast, air pressure forecast, or a combination thereof. The operations may further comprise:

obtaining different weather information corresponding to different areas within the area covered by the location, the orientation of the device and the distance; and displaying the weather information at relative positions over the view of the physical environment on the device. In a preferred embodiment, the operations include displaying a rendering of cloud. It may preferably comprise a rendering of the shape of the cloud, location of the cloud, or a combination thereof.

In another embodiment, the non-transitory computer-readable medium stores physical phenomena information comprising oceanic information. The oceanic information may comprise current, water temperature, salinity or a combination thereof.

In another embodiment, the physical phenomena information comprises geological information. The geological information may comprise earthquake information, $CO_2$ gas measure, $SO_2$ gas measure, Helium measure, faults information, mineral water prospections, natural or artificial galleries and petrol, mineral, mineral fossil prospections. It may comprise the location of an earthquake epicenter, movements of the earthquake epicenter, location of $CO_2$ gas measure, $SO_2$ gas measure, Helium measure, faults, mineral water prospections, and petrol, mineral, mineral fossil deposits. It may comprise the location of an earthquake epicenter, movements of the earthquake epicenter, location of $CO_2$ gas measure, $SO_2$ gas measure, Helium measure, faults, mineral water prospections, and petrol, mineral, mineral fossil deposits location, or a combination thereof.

In another embodiment, the non-transitory computer-readable medium comprises physical phenomena information related to Planetary Science information.

In another aspect, the invention provides a method for weather forecast comprising:

receiving weather forecast data based on Global Forecast System;

applying Weather Research and Forecasting Model-Environmental Modeling System to the received data; and generating weather forecast wherein a nesting approach is used. The nesting approach may comprise an initial grid of 512 km by 328 km with a distance between grid points of 8 km and a sub-nesting of a radio of 1/5.

In another aspect, the invention provides a method for generating personalized suggestions, comprising establishing a user profile;

generating suggestions to the user based on the user profile and a weather forecast; and notifying the user of the suggestions. The step of generating suggestions may further be based on additional information sources, comprising: accommodations, news, peer advices, or a combination thereof.

These implementations are mentioned not to limit or define the scope of the disclosure, but to provide examples of implementations to aid in the understanding thereof.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

FIG. 1C is the user device of FIG. 1A (with enlarged view) displaying the rain precipitation forecast in augmented reality—the image captured by the device combined with an information layer.

Like reference numbers and designations in the various drawings indicate like elements.

DETAILED DESCRIPTION

Defined Terms

The following terms appear in the specification repeatedly and are defined as follows:

"Geolocation responsive to the location of the device" refers to determining the geographical location and orientation of the user device and identifying physical data corresponding "responsive" to that location.

"Physical environment" refers to the actual view to the user as displayed on the device. It is the space where the user is located.

"Physical phenomena (information or data)" are data sets of physical phenomena and activity relevant to a particular geographic location. The data is normally stored on a server and partially stored in user device. The data can be real time data, estimated data or data based on models of events/phenomena which might take place. For example, but not limited to these examples, a physical phenomena data set might refer to high resolution spatial data of wind speed value, wind direction vectors, sun light intensity temperature, precipitation, snow, dew point temperature, helicity, temperature, humidity, mist, helicity, relative storm helicity, convective available potential energy, dew point, air pressure, cloud formations, cloud shape structures, atmosphere gases or aerosols volumes (atmosphere layers, oceanic water conditions, air dust aerosols, contamination air dust pattern) and, even vehicles traffic flow pattern physics.

Examples of Information Layers

Figure 1A:
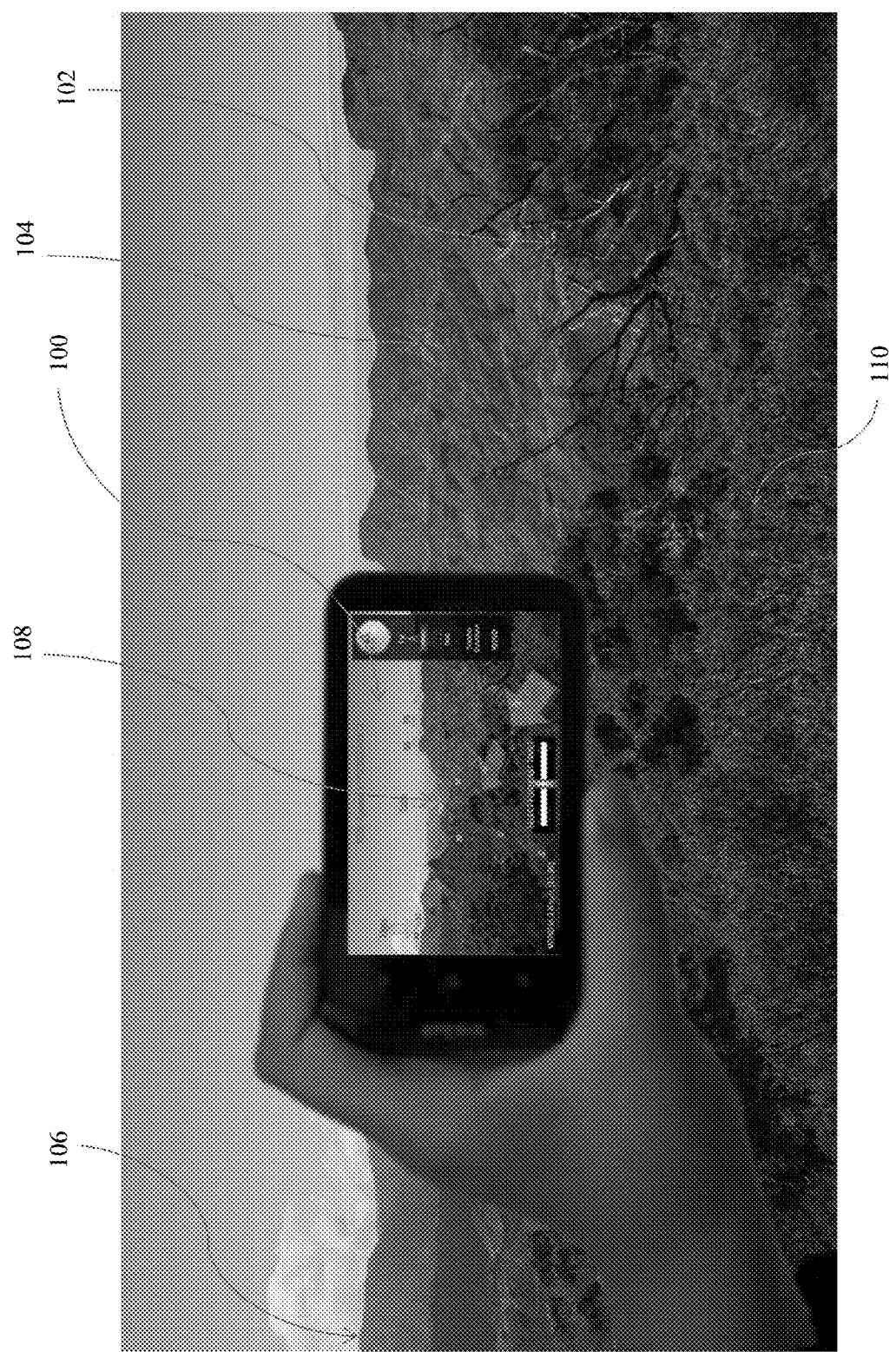
FIG. 1A is a user pointing a device at a physical environment. The physical environment captured by the user device is displayed on the device screen.

FIG. 1A is a user pointing device 100 at a physical environment. Device 100 can be any device capable of capturing and displaying images. In this example, the device 100 is a smart phone. Device 100 can be other devices, including but not limited to personal computers, mobile phones, electronic tablets, media players, dedicated device of Augmented Reality, GPS, etc. For example, device 100 can be iPhone, iPad, mobile phones running Android, etc. Device 100 can also be any "wearable" devices, such as augmented reality glasses, crystal LCD windows screens, airplane/helicopter pilot helmet, astronaut helmet, etc. In some implementations, device 100 can be a device with a touch sensitive screen.

In this example, the user is pointing device 100 at a physical environment that is in front of the user. In front of the user, there are mountains 102 with multiple ridges 104 and tips 106. Further away, there is a lower point—a valley among the mountains 108. In some areas, the mountain surface is covered with grass and trees 110.

Figure 1B:
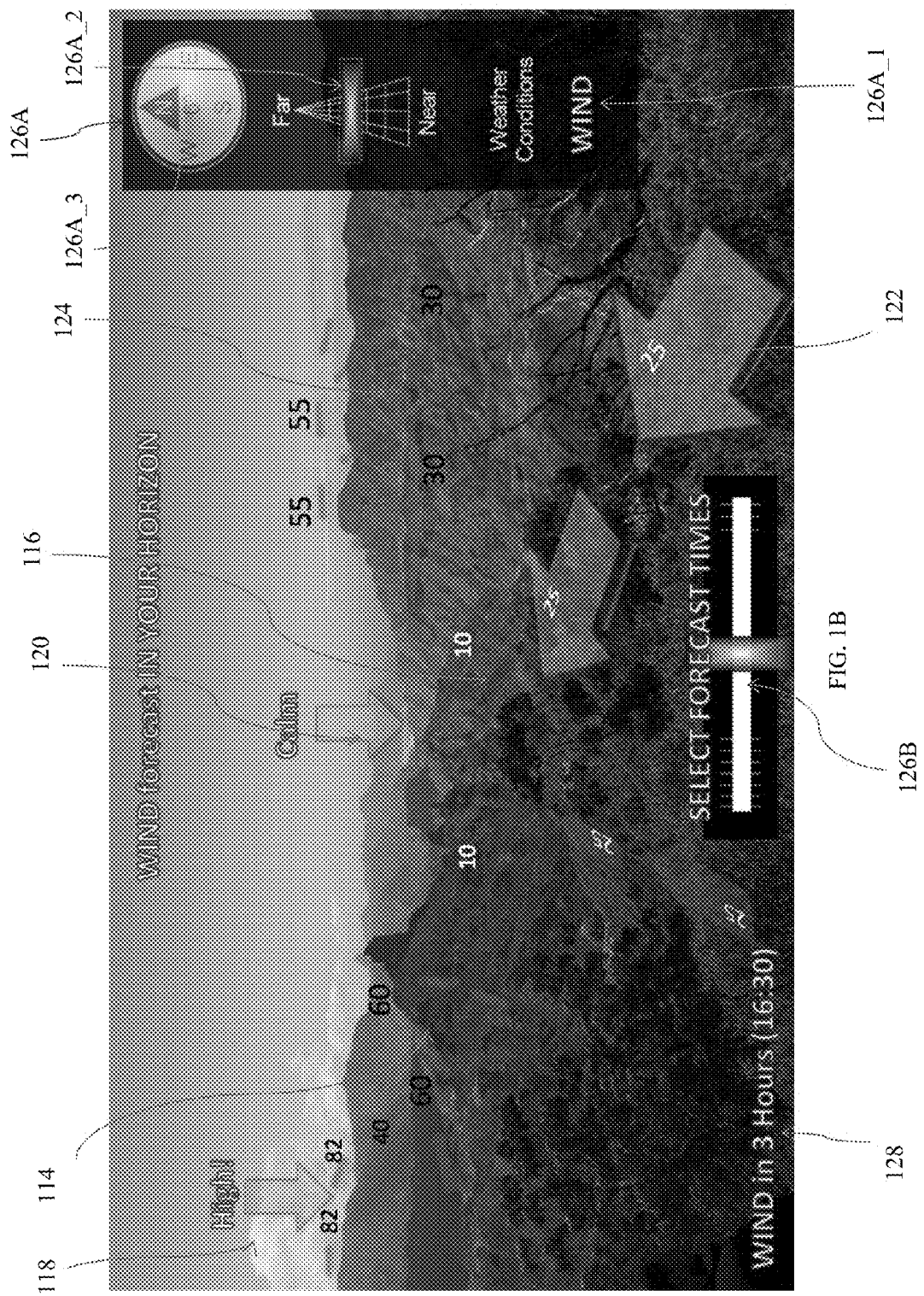
FIG. 1B is the device of FIG. 1A (with enlarged view) displaying the wind forecast in augmented reality—the image captured by the device combined with an information layer.

FIG. 1B is an exemplary physical phenomena information layer that displays wind forecast responsive to the physical environment that the user's device 100 is pointed at, and is overlaid on the physical environment imagery captured by the device. The physical environment captured by the device 100 can be in various forms, including but not limited to images or videos.

The information layer displays varying wind forecast corresponding to the different features and locations of the various areas to which the user's device is pointed. The wind speeds are indicated in any standard or desired units, e.g. knots/h. FIG. 1B shows, by way of example, the user device displaying wind (km/h) at different locations in the area the user is pointing at. At location 114 the wind is blowing along the ridges at a high speed (60), and the wind at location 116 is a light breeze (10). The wind at location 118, which is at higher altitude, has the highest speed (strong wind in this case) displayed with a warning symbol. It also shows there is no significant wind at location 120, displayed with a warning symbol, and that the wind 122, which is the wind in the area closest to the user, is a moderate breeze (25). Thus, the method of the invention makes it possible to display how the wind will behave according to the forecast method explained in the present invention, applied to the concrete physical characteristics of the environment the user is pointing at.

The information layer can display information in various forms, such as graphics, text colors or statistics relative to similar data displayed at other locations on the screen or relative to data for that location at a different point in time. For example, it may present the data as a percentage, relative to wind speed at its highest within the display area.

The user can customize various parameters through one or more control panels panel 126A and 126B. For example, a user can scroll the "Select Forecast Times" bar 126B to customize how much to move forward in time (hours or days, for example). Time parameter 128, as shown, is 3 hours from the current time. The user scroll the bar 126B and adjust the time parameter 128 as it will be in 6 hour.

On the control panel 126A, a user can select what weather conditions 126A_1 she would like to view (rain, cloud, sun, wind, mist, temperature, etc.) The Near/Far scroll button 126A_2 on the control panel 126A helps a user to select how deep the user can see on the screen. The "compass" 126A_3 at the top of the control panel helps the user to identify the direction in which the user is pointing the device.

A user can customize the distance and, accordingly, the area of forecast. In one embodiment, the default distance is the distance of how far a human can see. For example, the default distance may be 16 kilometers. The user can choose to include forecast for areas that is beyond the initial default distance. Or the user can choose to include an area that is, for example, only 5 kilometers from the user. The distance parameter is not limited to a set of pre-determined values. For example, the distance is not limited to a pre-determined set, including for example only 15 kilometers, 30 kilometers, etc.

FIG. 1C is an exemplary information layer that displays rain and cloud forecast responsive to the physical environment that the user's device is pointed at, and is overlaid on the physical environment captured by the device.

In this example, the information layer displays different rain forecast at different locations on the screen, which correspond to different geolocations of the physical environment captured by the device. In one embodiment, the information layer displays with high accuracy for differing weather information for areas of less than 1 kilometer. In the example shown, at the user location, cloud 138 with rain drops indicates there will be 8 liters of rain in the next 6 hours. Further away in the mountain, a smaller cloud with rain drops indicates there is an area of heavy rain 130, with 32 liters of rain in the next 6 hours. The individual user profile, discussed below, also determines if the information is cumulative (e.g. accumulation within a time period) or relevant to a chosen time point (e.g. precipitation/hr. at a chosen time point, e.g. 6 hrs. from now).

Similar to FIG. 1B, the user can customize the distance 126A_2 of the area to be covered by the forecast. The user can also customize the time parameter 126B of the forecast. In this example, the time parameter 132 is within next 6 hours. The user can change to next 8 hours, etc.

More detailed information within the specified time frame may also be provided. In this example, detailed information 134 indicates that the rain will improve in 2 hours is provided to the user.

The information layer can also display a forecast rendering of the position and the shape of the cloud 136. A user can thus enjoy the various features of the cloud-shape, position, etc. even before the cloud is actually formed in the sky.

Figure 1D:
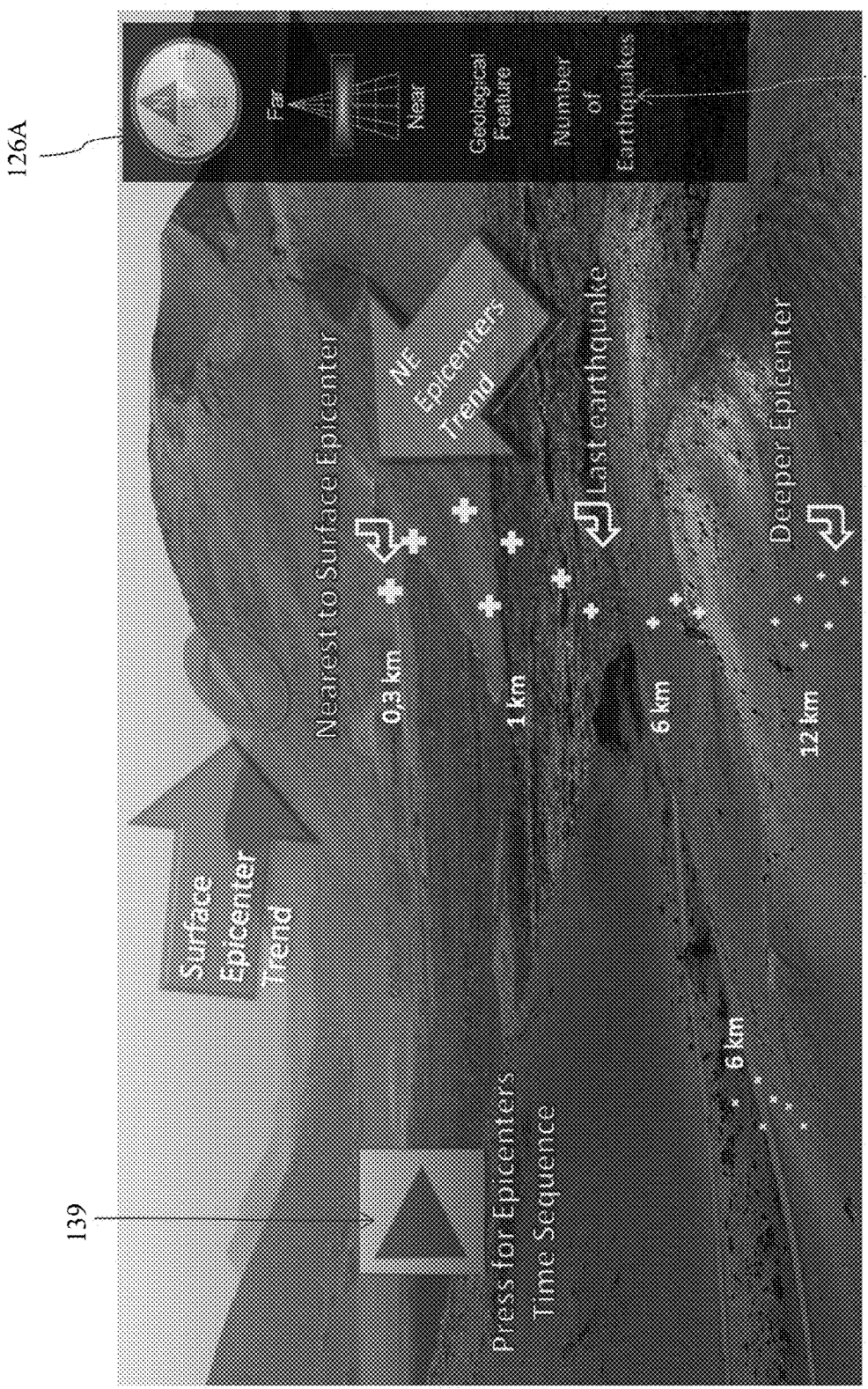
FIG. 1D is the user device displaying geological information in augmented reality—the image captured by the device combined with an information layer.

FIG. 1D is an exemplary information layer that displays geological information responsive to the physical environment that the user's device is pointed at, and is overlaid on the physical environment captured by the device.

In this example, a user points the device at the ground, and earthquake and epicenter information is displayed. The geological AR display application can indicate the location of earthquakes epicenters and show the movements of the epicenters.

A user can specify one or more parameters. In one embodiment, the user can specify a time parameter and the AR displays information responsive to the time parameter. For example, the user can specify a time parameter and view the movements of the epicenters within that time frame.

The "Press for epicenters time sequence" 139 will show an animation of the earthquake sequence in time (a succession in time of different earthquake epicenters).

The "Geological feature" control panel zone 126A_4 is a button a user can press to select the desired Geological condition to know, such as earthquake, faults, fissures, or any geological feature which can be digitalized.

Other Exemplary Applications

Besides meteorological applications and geological applications, there are many other utilities for AR displays of physical phenomena information. AR displays of physical phenomena information may be used for sea applications. A user can point his device at the sea, and observe with AR the currents displayed over the sea, the salinity, water temperature, vorticity, dissolved oxygen, wave height, dynamic depth anomaly, nitrate, etc. This may be found helpful by people who enjoy recreational fishing or for scientific or professional purpose. The AR displays can indicate where the best place is for fishing or for any activity where sea water physical feature must be considered.

The AR displays for sea applications can respond to one or more parameters. In one embodiment, the user can specify a time parameter and the AR displays information responsive to the time parameter. For example, the user has one hour of time for fishing. The user can specify the time parameter as within next hour and find water information for the next hour.

AR displays can also be applied to Planetary Science applications. Such application can display similar geo-positioned mentioned features in any planet, planetoid or natural satellite.

Geolocation Mathematics

This section explains the mathematics behind overlaying annotations on the device's screen of all place marks that are situated with the visible area. The algorithm is discussed in detail in various publications. In particular, as mentioned in "Reference 1" the following is the mathematical methodology behind current art to geo-locate points in Augmented Reality.

Figure 2A:
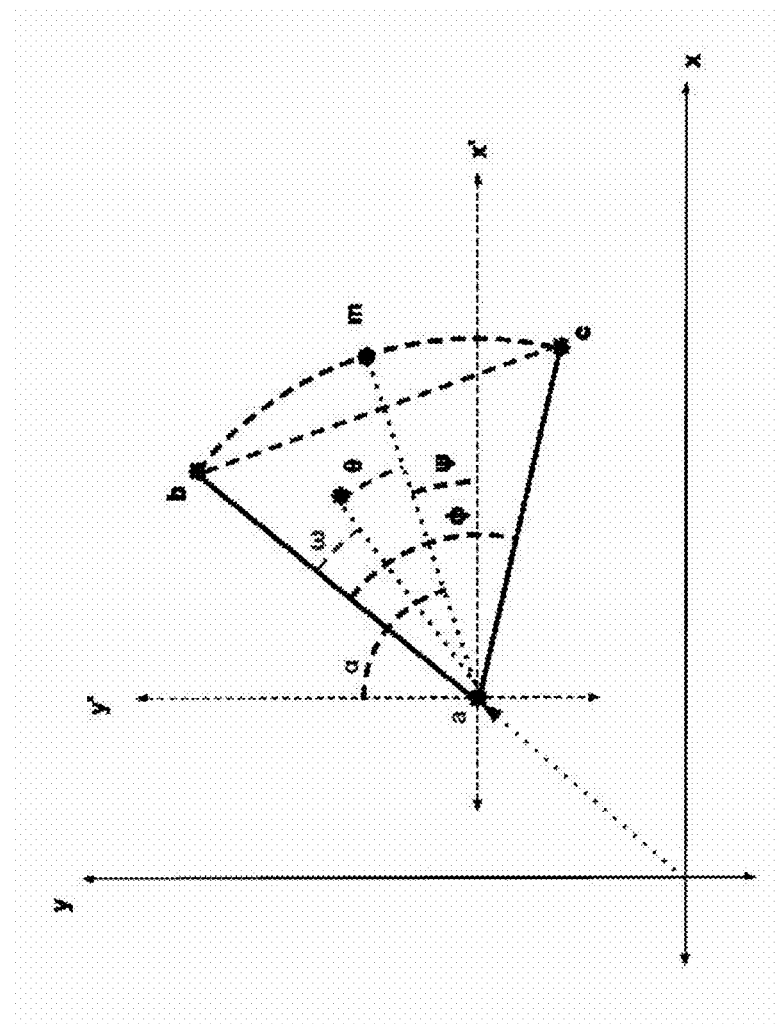
FIG. 2A is diagram of a user device location and orientation.

Refer to FIG. 2A. An exemplary case that will be addressed to herein is that of a user standing at a location with longitude ax, and latitude ay, and pointing the back of their device to a given direction, creating an angle α with a line parallel to the latitude lines.

The exemplary device is any device comprising a camera having a viewing angle φ, which will depend on its orientation being portrait or landscape displayed, and a maximum field of interest from the observer perspective designated as radius r.

$$\phi = \begin{cases} \dfrac{\pi}{3} & \text{if device orientation is landscape} \\ \dfrac{\pi}{4} & \text{if device orientation is portrait} \end{cases}$$

Thus, the longitude and latitude expressed in degrees needs to be converted to miles or kilometers. There should be taken into account that the Earth shape is not a full circle and its radius at the Equator Line is 3,956.547 miles, hereby designated as radius s.

If the device is standing at point a:

$$a = \begin{bmatrix} a_x \\ a_y \end{bmatrix} = \begin{bmatrix} \text{device's longitude} \\ \text{device's latitude} \end{bmatrix}$$

Wherein there are two different conversions: one for latitude and one for longitude.

$$t = \dfrac{2\pi s}{360°} \text{ miles per degree of latitude}$$

$$g = t \cos\left(a_y \frac{\pi}{180°}\right) \text{ miles per degree of longitude}$$

In an exemplary embodiment, a user will be pointing the exemplary device to a given direction, and said direction will have an angle $\alpha$ with respect to the true north (heading). The angle $\alpha$ should be turned to an angle $\psi$, which will provide the heading relative to an horizontal line parallel to the x axis: $\psi = \pi/2 - \alpha$ Thus, points b and c can be calculated, given a distance of interest r, regarding the observer perspective.

$$b = \begin{bmatrix} b_x \\ b_y \end{bmatrix} = \begin{bmatrix} \frac{r}{g}\cos\left(\psi + \frac{\phi}{2}\right) + a_x \\ \frac{r}{t}\sin\left(\psi + \frac{\phi}{2}\right) + a_y \end{bmatrix}$$

$$c = \begin{bmatrix} c_x \\ c_y \end{bmatrix} = \begin{bmatrix} \frac{r}{g}\cos\left(\psi - \frac{\phi}{2}\right) + a_x \\ \frac{r}{t}\sin\left(\psi - \frac{\phi}{2}\right) + a_y \end{bmatrix}$$

Given a place mark at point p:

$$p = \begin{bmatrix} p_x \\ p_y \end{bmatrix} = \begin{bmatrix} \text{placemark's longitude} \\ \text{placemark's latitude} \end{bmatrix}$$

At this point, there is a need for a calculation of whether p is within the region of interest or not.

For this purpose, there is used the projection of vector $\vec{ap}$ on vector $\vec{ab}$ expressed as a coordinate of vector $\vec{ab}$, and the projection of vector $\vec{ap}$ on vector $\vec{ac}$, expressed as a coordinate of vector $\vec{ac}$. The eigenvalues $\lambda$ and $\sigma$ for it are thus calculated.

$$\lambda = \frac{\vec{ap} \cdot \vec{ab}}{\|\vec{ab}\|^2}$$

$$\sigma = \frac{\vec{ap} \cdot \vec{ac}}{\|\vec{ac}\|^2}$$

So, now it is possible to determine whether a place mark p is within the region of interest and therefore visible by:

$$p(\lambda, \sigma) = \begin{cases} \text{VISIBLE} & \forall\ (\lambda > 0) \wedge (\sigma > 0) \wedge (\lambda^2 + \sigma^2 \leq 1) \\ \text{NOT VISIBLE} & \text{Otherwise} \end{cases}$$

Figure 2B:
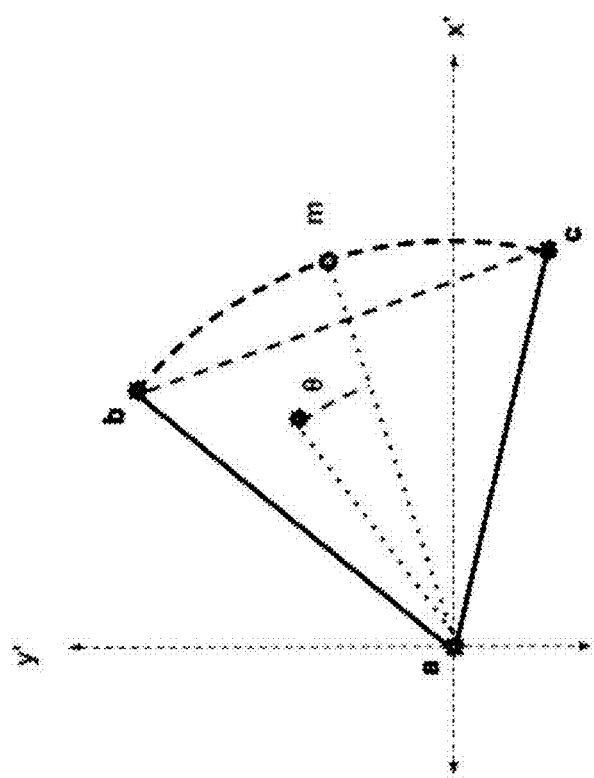
FIG. 2B is diagram of a user device screen with coordinates and angles.

Refer to FIG. 2B. After the first calculations step, to overlay Augmented Reality annotations on the device's screen, the coordinates, sizes, and perspectives of a place mark p on the device screen also need to be calculated.

For that purpose, there is a first step in which the mid-point m of the boundary arc segment is calculated and the vector $\vec{am}$ is determined. Reference point m represents the center of the device screen, and points b and c represent the screen left and right margins.

$$m = \begin{bmatrix} m_x \\ m_y \end{bmatrix} = \begin{bmatrix} \frac{r}{g}\cos\psi + a_x \\ \frac{r}{t}\sin\psi + a_y \end{bmatrix}$$

$$\theta = \arccos\left(\frac{\vec{am} \cdot \vec{ap}}{\|\vec{am}\|\|\vec{ap}\|}\right)$$

Figure 2C:
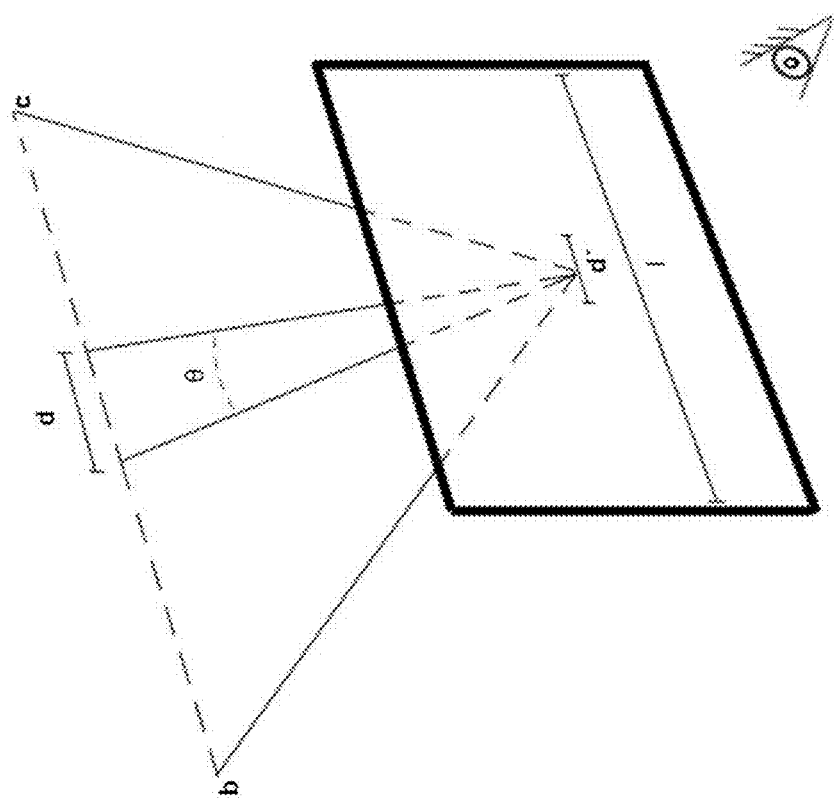
FIG. 2C is a drawing of a user screen and distance.

Refer to FIG. 2C. Thus, the distance d can be calculated, so as to represent how far a place mark p is from the vector $\vec{am}$. The length of vector $\vec{bc}$ is equivalent to the length l in the screen, and this equivalence makes it possible to calculate d' value.

$$d = \|\vec{am}\|\sin\theta \quad d' = l \cdot d / \|b - c\|$$

At this point, it is necessary to calculate a point (x, y) for the place mark p representing the center of the augmented reality annotation on the device, and the dimensions (w, h) width and height thereof.

$$x = \frac{l}{2} + d'$$

$$y = s \cdot y\text{Max} \quad w = s \cdot \text{defaultWidth} \quad h = s \cdot \text{defaultHeight}$$

A scale factor s, varying from [0,1], is used to depict annotations as smaller and closer towards the top of the screen if the place mark is further from the observer, or as larger and closer towards the bottom of the screen if a place mark is closer to the observer.

$$s = 1 - \frac{\|\vec{ap}\|}{r}$$

yMax, defaultWidth and defaultHeight are maximum values. By multiplying these values by the scale factor the size and y position become inversely proportional to the place mark distance to the observer.

Figure 2D:
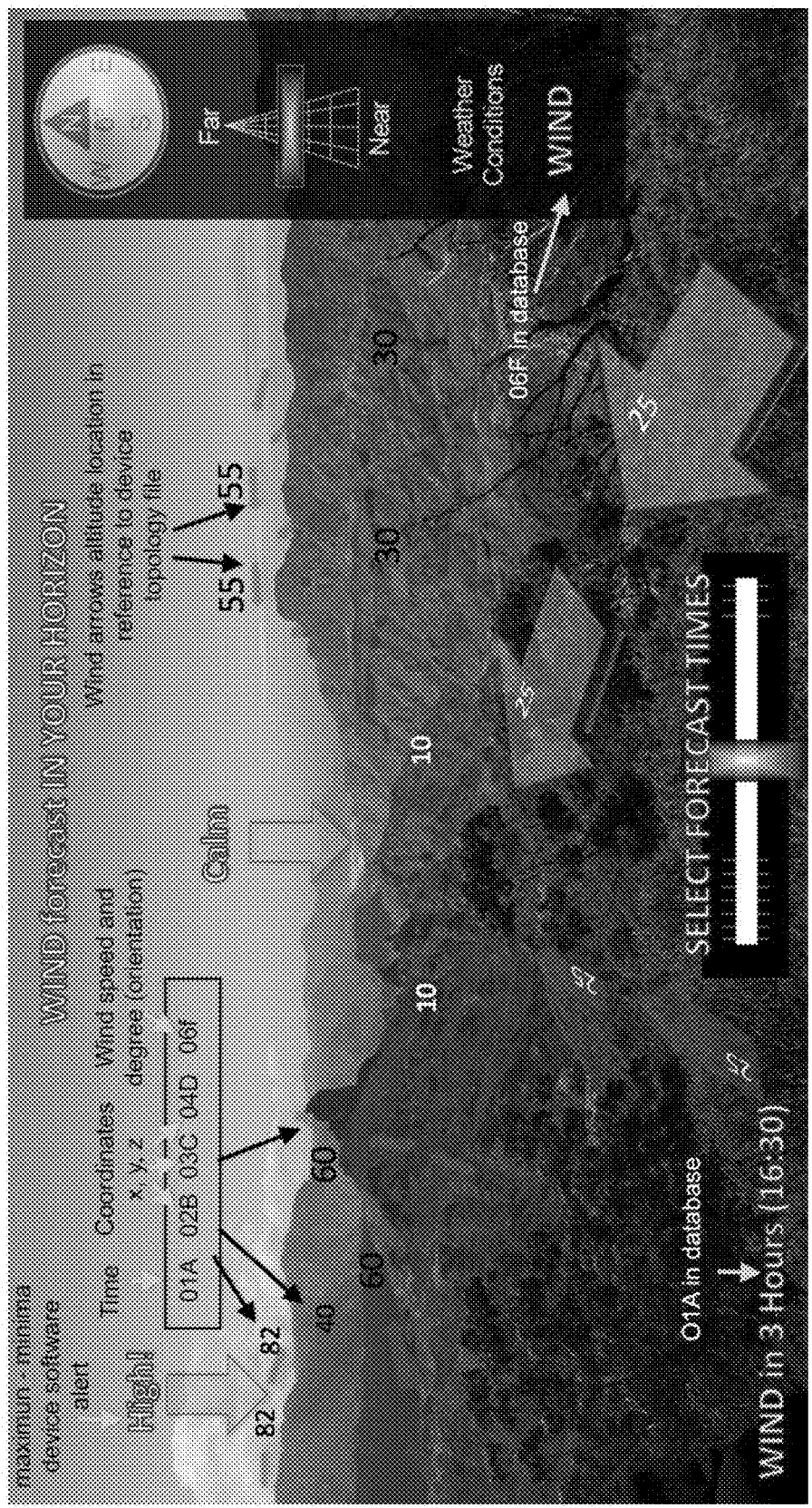
FIG. 2D is an exemplary information layer with annotation for explanation purpose.

Refer to FIG. 2D. The annotations closer to the observer appear in larger size and closer to the bottom of the screen, and as distances from the observer grow, the annotations get smaller and closer to the top of the screen.

Exemplary System Architecture

Figure 3:
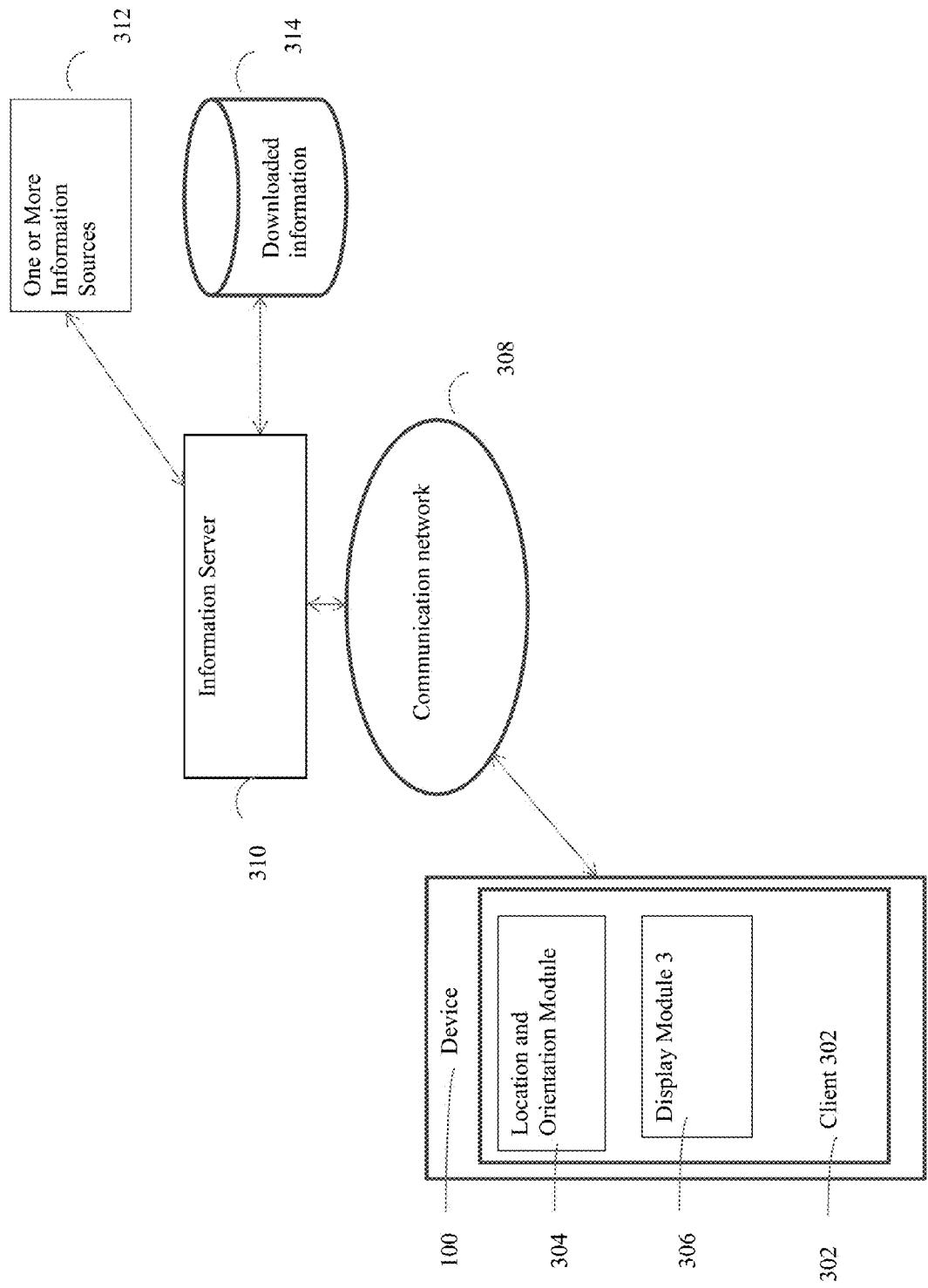
FIG. 3 is a block diagram of an exemplary computer system implementing AR displays of physical phenomena information.

FIG. 3 is a block diagram of an exemplary computer system implementing AR displays of physical phenomena information. According to various implementations, a user installs the client application 302 on the user device 100. The installed client application 302 includes a location and orientation module 304 and a display module 306.

Device 100 can be any type of mobile terminal, fixed terminal, or portable terminal including a mobile handset, station, unit, device, multimedia tablet, Internet node, communicator, desktop computer, laptop computer, Personal Digital Assistants (PDAs), head-up display (HUD), augmented reality glasses, projectors, or any combination thereof. It is also contemplated that the device 100 can support any type of interface to the user (such as "wearable" circuitry, head-mounted circuitry, near-eye displays, etc.). As shown in FIG. 3, device 100 has connectivity to an information server 310 through communication network 308.

Module 304 includes a location component and an orientation component. The location component can determine a user's location. The orientation component can determine which direction the user device 100 is pointed at.

The location component can determine a user's location. The user's location can be determined by a triangulation system such as GPS, A-GPS, Cell of Origin (nearest cell) lateration, angulation, location patterning or other extrapolation technologies. Standard GPS and A-GPS system can use satellites to pinpoint the location of a device 100—where the device is at and the altitude of the device. A Cell of Origin system can be used to determine the cellular tower that a cellular device 100 is synchronized with. This information provides a coarse location of the device 100 because the cellular tower can have a unique cellular identifier (cell-ID) that can be geographically mapped. The location component may also utilize multiple technologies to detect the location of the device 100. In some embodiments, wireless local area networks can be used to determine location. In another embodiment, the physical environment can be tagged with location information that can be received by the device 100.

The orientation component can indicate which direction the user device 100 is pointed at. The orientation component can be, but not limited to, a compass, a magnetometer, an accelerometer, a gyroscope.

In one embodiment, module 304 includes a magnetometer. A magnetometer is an instrument that can measure the strength and/or direction of a magnetic field. Using the same approach as a compass, the magnetometer is capable of determining the direction of a device 100 using the magnetic field of the Earth.

In one embodiment, module 304 includes an accelerometer. An accelerometer is an instrument that can measure acceleration. Using a three-axis accelerometer, with axes X, Y, and Z, provides the acceleration in three directions with known angles. When device 100 is stationary, the accelerometer module can determine the angle device 100 is pointed as compared to Earth's gravity.

In one embodiment, module 304 includes a gyroscope. A gyroscope is a device for measuring orientation. The gyroscope can be used to sense or measure pitch, roll and yaw angles based on angular momentum principles. From a starting point, pitch, roll, and yaw angles can be used to measure the orientation of device 100. Gyroscope information, in addition to accelerometer information and magnetometer information, can be used to determine the orientation of device 100 without any other calibration requirements. Additionally, this combination of information can be used to determine the change in height of device 100 after a starting point.

In one embodiment, module 304 includes an altimeter. An altimeter is a device for measuring altitude. In one embodiment, a barometric altimeter is used to measure the altitude of device 100 as a measurement of altitude in comparison to sea level based on atmospheric pressure. In another embodiment, a radar altimeter measures height above ground level based on the time of a radio signal to reflect from the ground back to device 100.

In various implementations, how far a user can see is determined by the device location and the altitude of the device. For example, the distance is determined according to the altitude of user's device: the higher the altitude is, the longer the distance and the bigger the area for forecast. In another embodiment, a default distance is set. For example, the default distance can be the average of how far a human's eyes can perceive. The default distance can be set at 16 kilometer.

In one embodiment, other information sources can help determine how far the user can see. For example, Google Earth can be used to determine the surrounding environment of the user device-whether an object is blocking the view of the user device. The user can be reminded to move to a place with an unobstructed view. In another embodiment, the information layer can be displayed based on the area responsive to location, altitude and distance, regardless whether the view is blocked.

Through network 308, client 302 communicates with information server 310. Client 302 sends the location and orientation information to server 308. In one embodiment, the user initiates sending the location and orientation information to server 310. For example, the user can click on a button provided by client 302 on device 100. Client 302 then sends the location and the orientation information to server 310. In another embodiment, module 304 can detect the movement of user device 100. For example, such movement can be detected from a motion sensor embedded in the user device 100. Module 304 retrieves data from the motion sensor. When module 304 detects the location or the orientation has changed, it can send a notification, and location and/or distance information to client 302. Client 302 will send the new location and/or orientation information to server 310.

Communication network 308 of the system depicted in FIG. 3 may include one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

According to various implementations, after receiving the location and the orientation of the user device, and a distance, server 310 determines the geolocation of the view of the user device. From one or more information sources 312, server 310 retrieves physical phenomena information or other information that are relevant for the geolocation of the view of the user device. Information sources 312 can be physical phenomena information provided by the U.S. National Oceanic and Atmospheric Administration (NOAA), or other entities that provide physical phenomena information such as the European Centre for Medium-range Weather forecast. Information sources can also be information centers provided by universities or research organizations. In short, there are country or regional governmental agencies or private institutions that can provide physical phenomena information.

Information sources 312 can be information sources other than physical phenomena information sources. For example, server 310 can retrieve buildings or terrain information from Google Earth. Such information sources can help the system generate more accurate information. It can also help the system to notify the user if the view of device 100 is blocked by a surrounding building, etc.

In one embodiment, server 310 retrieves information from information sources 312 in real time. When server 310 receives location and orientation information from client application 302, server 310 sends a request to 312 and retrieves needed information. In another embodiment, server 310 downloads from information sources 312 and stores information in database 314. In some implementations, information downloaded from sources 312 are processed in advance and then stored in database 314. For example, data may be stored and indexed according to earth zones. When server 310 receives location and orientation information from client 302, instead of retrieving data from information sources 312, server 310 retrieves information from database 314. In various implementations, server 312 may retrieve information from sources 312 at a pre-determined time frame. For example, server 312 may retrieve information from sources 312 every six hours and stored the retrieved information in database 314.

According to various implementations, client application 302 receives physical phenomena information from server 310 through network 308. Display module 306 displays the received physical phenomena information as an information layer overlaying a view of a physical environment on a display of device 100. In one embodiment, as shown in FIG. 1C, differing weather forecast that corresponds to different areas of the physical environment captured by user device 100 is displayed. The relative positions of the different areas on the view of the physical environment are calculated. The differing weather forecast is displayed at relative positions on the view of the physical environment. In some implementations, server 310 may capture the geological features of the area indicated by the location, the orientation and the distance of user device 100 accurately. As is shown in FIG. 1B, a physical phenomena information layer is overlaid on the view of the physical environment with great accuracy. For example, in FIG. 1B, a wind direction is displayed along a ridge of a mountain.

Exemplary Process for AR Displays of Physical Phenomena Information

Figure 4:
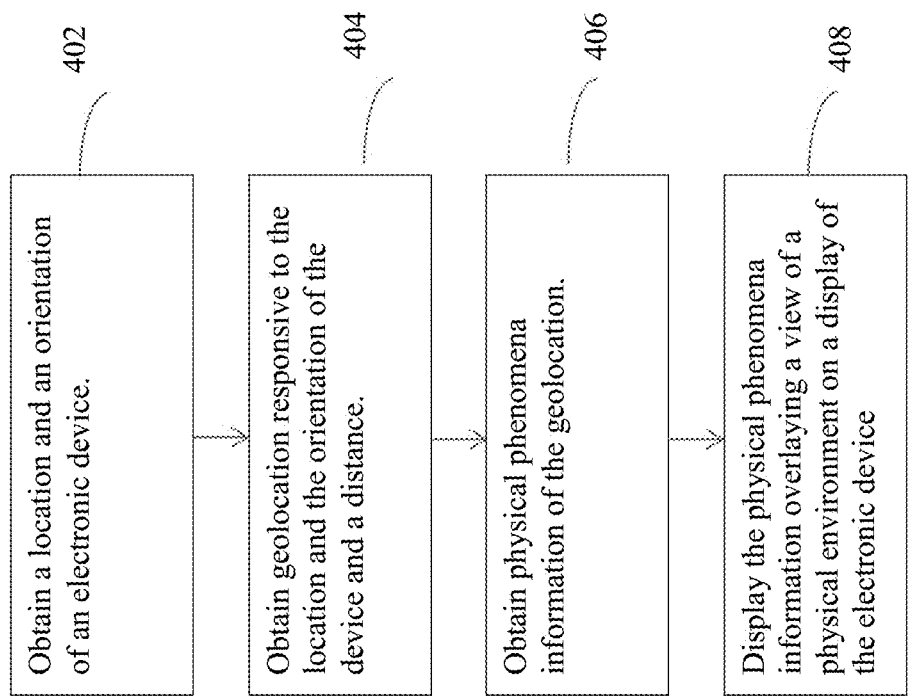
FIG. 4 is an example process for AR displays of physical phenomena information.

FIG. 4 is an example process for AR displays of physical phenomena information. At step 402, server 310 receives a location and an orientation from device 100. According to various implementations, module 304 captures the location information from the GPS system embedded in the device 100, and capture the orientation—which direction device 100 point at—from various modules that are included on device 100, such as a magnetometer, an accelerometer, a gyroscope or an altimeter.

At step 402, server 310 may receive a distance as well. In one embodiment, client 302 may send the distance of the view of the physical environment captured by device 100. For example, module 304 may retrieve information from sources such as Google Earth. Based on the surrounding environment of the device 100, module 304 may calculate the distance and notify client 302. Client 302 then sends the distance to server 310. In another embodiment, the user may customize the distance parameter. Client 302 may then send the user customized distance parameter to server 310. In some implementation, server 310 may determine the distance. For example, based on the received location and orientation, server 310 calculates the distance or use a default distance.

At step 404, the geolocation responsive to the location and the orientation of device 100 and a distance is obtained. The mathematical methodology is described in detail in the previous section "Geolocation Mathematics" and is disclosed in Dalmo's paper. Based on the distance (the radius of the region), and the location and the orientation of device 100, the geolocation of the region can be determined. The geolocations of points within the region can also be determined.

At step 406, physical phenomena information of the geolocation is obtained. In one embodiment, the information can be pre-computed and stored in a repository that server 310 has access to. In another embodiment, the information can be generated on the fly. For example, server 310 retrieves information from information sources such as NOAA or Google Earth and calculates the information on the fly. In another embodiment, part of the information is pre-computed and part of the information is generated on the fly. For example, meteorological information may be pre-computed, and information such as there is a building surrounding the user may be computed on the fly.

At step 408, the physical phenomena information is sent to device 100 and the display module renders the physical phenomena information overlaying the view of the physical environment on a display of device 100. In some implementations, within the area of the physical environment on a display by device 100, the physical phenomena information may vary. The display module may calculate the relative positions on the device screen of where to display the different physical phenomena information. In some implementations, the display module displays the physical phenomena information in texts and numbers. In other implementations, the display module displays the physical phenomena information using graphics and symbols. User can customize the display of the physical phenomena information.

According to various implementations, data from server 310 may be downloaded at once. For example, although the user only request information for the next 3 hours, server 310 may send information for the next 2 days. If the user later requests information for the next 6 hours, client 302 will retrieve information locally from what is downloaded before, rather than retrieving information from server 310. In other words, data are cached locally at device 100. The system may have a mechanism to check whether the cached data needs to be updated. For example, even if the physical phenomena information for the next 6 hours has already been downloaded locally at device 100, client 302 will communicate with server 310 to check whether the physical phenomena information corresponding to user location has changed from the last time since the data is downloaded. A timestamp can be used. If the server 310 indicates that the data has changed, then client 302 will download data again.

Exemplary Process for an Augmented Reality Weather Forecast Application

Figure 5:
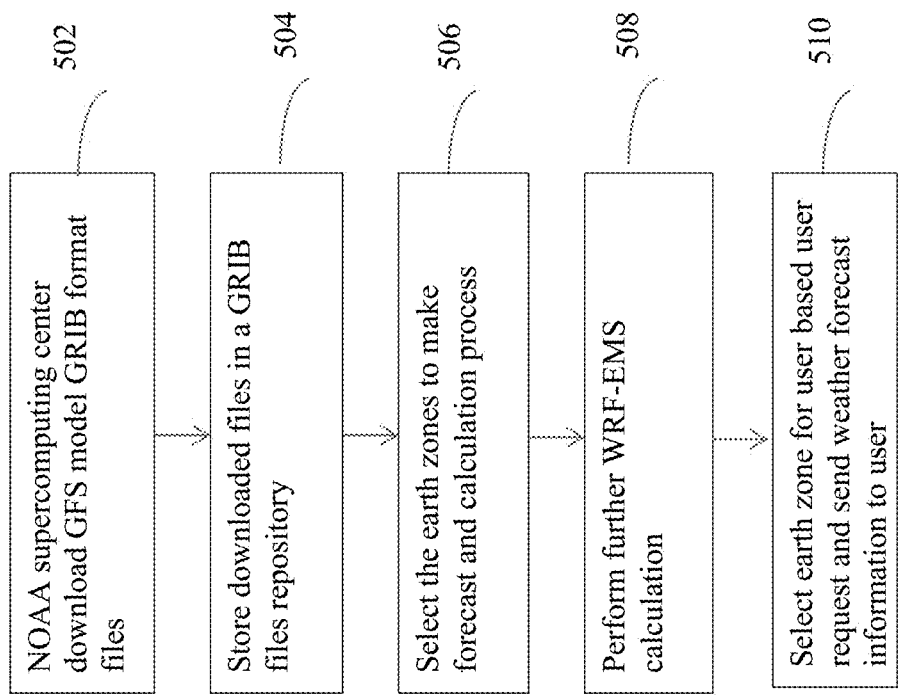
FIG. 5 is an example process for an example weather forecast application.

FIG. 5 is an exemplary process for an example weather forecast application. In one embodiment, at step 502, weather forecast data from an information source—a National Oceanic and Atmospheric Administration ("NOAA") supercomputing center is downloaded. The data may be downloaded from the National Weather Service (NWS), National Centers for Environmental Prediction (NCEP). The data may be calculated by the information source using the Global Forecast System (GFS) Model. GFS is a weather forecast model produced by NCEP. The downloaded file may be in the GRIB format. GRIB (GRIdded Binary or General Regularly-distributed Information in Binary form) is a concise data format commonly used in meteorology to store historical and forecast weather data. Weather forecast data may be downloaded at a time interval. NCEP updates its GFS modeled data every six hours. In one embodiment, at step 502, data is downloaded from NCEP every six hours to get the updated data.

At step 504, the downloaded files are stored in a GRIB files repository.

At step 506, certain areas (earth zones) from the downloaded files are selected. According to various implementations, all the Earth areas are covered by the example weather forecast application (WRF). There are areas where cell phone services or communication networks are not available. But as far as the user is in a GPS coverage area (or other geolocation systems implemented in the device), AR geolocation can be performed. Therefore, in those areas where cell phone services or communication networks are not available, the system of the invention may provide the user with the possibility of previously downloading the weather data 510 in the device, to be used later in the area with no cell phone services or communication networks available. Even more, the device could include a satellite networking data receiver from which the user can download weather predictions with the more updated interval of each 6 hours in almost any place of the Earth where communications satellite have coverage (like Iridium satellites). Therefore, at step 506, areas (earth zones) that weather forecast services offer, are selected.

At step 508, further calculation of the downloaded data is performed. In one embodiment, such calculation uses WRF-EMS based on the received GFS modeled data and a nesting approach.

WRF-EMS stands for Weather Research and Forecasting Model-Environmental Modeling System. It is created by NOAA/NWS Science and Training Resource Center, from open source WRF software, which is a specific computer program with a dual use for forecasting and research. WRF is the latest numerical program model adopted by NOAA's National Weather Service. WRF-EMS package includes the original WRF model code and a series of scripts used to rapidly acquire initial conditions, launch forecasts, and post-process model output into a more readily usable format.

Nesting is an approach for weather modeling forecast. Generally speaking, through the nesting approach, a finer grid for a smaller area of interest can be nested inside a larger, coarser grid.

The nesting approach is to create a domain grid (a two-dimensional parallelogram) from which WRF-EMS is used to calculate more details of smaller scales and higher resolution. WRF-EMS provides more information. For example, WRF-EMS can indicate that there is a mountain in the earth zone, or there is the sea on the left, or there is a desert on the right. Based on information provided by WRF-EMS, high resolution and accuracy can be obtained.

The calculation will start from low resolution data obtained from GFS, where meteorological parameters of predictions consist of a grid of a reticular parametric worldwide level. A grid can be in a 0.5, 1 and 2.5 degree low resolution. Each degree of latitude is approximately 69 miles (111 kilometers) resolution; and this kilometric measure vary depending on the zone of the Earth (due the Earth being an ellipsoid, not a perfect sphere).

The nesting approach starts with the GFS data and starts with the first nest-what is often called Mother of all Domains (MOAD). This is the main nesting where high resolution weather prediction calculation starts. MOAD nesting can be used itself for predictions with high resolution.

In one embodiment, a MOAD of x=512 km and y=328 km with a distance between Grid Points of 8 km is the starting point for calculations. After the first calculation of this MOAD, another calculation of sub-nesting is performed. In the sub-nesting, a ratio of 1/5 (grid spacing ratio to parent is 1/5) with respect to a MOAD of x=512 km and y=328 km is applied, giving a distance as a result for the sub-nest (second domain) for each grid of the sub-nest of 1.6 km (a square of 65.6 km for each size). At the sub-nesting step, WRF-EMS is used to calculate more details of smaller scales and higher resolution.

With all the above mentioned parameters selection, the sub-nest (final calculation for more resolution) offers a high resolution below the grid of 1.6 km. Such resolution and accuracy has been demonstrated through various experiments and comparisons by the inventor. High resolution of hundreds of meters has been produced: predicting even the detention zone of the clouds or complex environments like local heavy rain or unusual isolate cloud formation with very clear frontier of cloud formation zone and even the shape of the mentioned cloud.

Consequently, a sub-nesting protocol with a first domain MOAD with x=512 km and y=328 km and a second domain (sub nesting) of 1.6 km grid distance in a ratio of 1/5 from the mentioned x=512 km and y=328 km have been found very useful. The nesting protocol as described above has achieved accuracy with reasonable computer resources. The computing time of this protocol is reasonable. The result provides a spatial accuracy from hundreds of meters to one or more kilometers.

After GFS source data and WRF-EMS calculations with nesting and sub-nesting approach with the feature of ratio and size mentioned before, output files results are obtained depending on the scripts used in the process. In the art there are a plurality of scripts and/or software that can be used to extract, interpolate or graphically display the result of WRF-EMS model (NCEP UPP, RIP4, ARWpost, VAPOR, GrADS, etc.).

The present system will use a multidimensional coordinate protocol to manage and pre-process the data for the geo-located augmented reality of present invention. In one embodiment, the known file wrfout from WRF-EMS, where whole forecast data are included, is used. This is to filter or to interpolate the data required for the geo-located augmented reality (GAR).

There are some routines in the art in order to extract from wrfout file the data of interest. In one embodiment, wrfout_to_cf.ncl is used, this routine is explained in detail at "Reference 2". This routine basis is to make the wrfout files more useful and practical for scientific graphical representations or for raw data process. This routine makes the resulting file comply with the NetCDF (Network Common Data Form) format, which is compatible with a wide configuration of libraries and self-describing, machine-independent data formats which support the creation, access, and sharing of array-oriented scientific data. The project is hosted by the Unidata program at the University Corporation for Atmospheric Research (UCAR). As commented in the above web page, there are a number of WRF post-processing utilities to create output files and/or graphics for scientific use (e.g. NCEP UPP, RIP4, ARWpost, VAPOR). wrfout_to_cf is just one solution to create post-processed WRF output files that are more convenient to work with in a scientific data project. For the present invention, wrfout_to_cf enables to better select the parametric data needed for visual representation in the geo-located augmented reality user device.

The pre-processing of WRF output files enables the present invention to select variables, time reference, vertical levels, and spatial and temporal sub-setting.

Any other script or software application can be used or created in order to extract and select the variables of interest for the geo-located augmented reality of the present invention.

For example, this part of pre-process is not limited to numerical data itself, interpolation software can be used to obtain a vector representation of weather events. This vector representation could be represented as an example under the well-known Computer Graphic Metafile. This vector post-process can be used to create a virtual image, a virtual 3D space or any diagram which could also be used by a geo-located augmented reality system.

In short, all these technologies converge in a sub-setting of key spatial reference (with vertical level), time references (in order to classify the forecast phenomena in time) and the weather variable itself. Most of them are use in the art for graphical interpolation of weather variable fields. Here below is shown a typical header and parametric description of a GrADS descriptor file model.ctl:

dset ^model.grb
title "Sample Model Data for GrADS Tutorial"
undef 1e+20
dtype grib
index ^model.gmp
xdef 72 linear 0.000000 5.000000
ydef 46 linear −90.000000 4.000000
zdef 7 levels
1000 850 700 500 300 200 100
tdef 5 linear 0Z2jan1987 1 dy
vars 8
ps 0 1, 1, 0, 0 Surface pressure [hPa]
u 7 33,100 Eastward wind [m/s]
v 7 34,100 Northward wind [m/s]
z 7 7,100 Geopotential height [m]
t 7 11,100 Air Temperature [K]
q 7 51,100 Specific humidity [kg/kg]
ts 0 11,105, 2 Surface (2 m) air temperature [K]
p 0 59, 1, 0, 0 Total precipitation rate [kg/(m^2*s)]
endvars But the wrfout_to_cf.ncl approach represent the advantage to allow systems or programs to select a concrete set of numerical parameters to extract from the output wrfout files of WRF-EMS.

As an example, shown below is a possible output field's database chain that can be used by present invention (but not limited):

| 00X | 01A | 02B | 03C | 04D | 05E | 06F | 07G | 08H | 09J | 10K |
|---|---|---|---|---|---|---|---|---|---|---|
| Control digit | Time | Xcoordinate | Ycoordinate | Zcoordinate (level) | Pressure at level | wind speed vector- degree- (from wrfout parameters) | Specific humidity | 2 meters air temperature | Total precipitation rate (12 hours accumulated e.g.) | Helicity |

All these parameters can be codified, but are not limited to this classification, in order to create an easy embedded light bytes chain to be transmitted to user devices, so the ratio of uplink and downlink with servers and with user device is very low as no complex data are sent to device user. The GAR app installed in the device will interpret the codes and represent graphically as mentioned in the next paragraph.

For example, 06F code joined to 01A 02B 03C 04D will display on user screen a data of wind speed (in m/s) in a precise zone of the display of GAR and even an arrow indicating the orientation of the wind.

The following table (taken from wrfout_to_cf.ncl and "Reference 2") is an example of the configuration of parameters to be selected for the system.

| CF | CMIP | long_name | standard_name | Units | Notes |
|---|---|---|---|---|---|
| SST | | Sea-Surface Temperature | sea_surface_temperature | K | |
| T_sfc | | Temperature at the Surface | surface_temperature | K | |
| p_sfc | | Pressure at the Surface | surface_air_pressure | hPa | |
| slp | | Sea-Level Pressure | air_pressure_at_sea_level | hPa | Created using WRF-NCL procedures |
| slp_b | | Sea-Level Pressure | air_pressure_at_sea_level | hPa | Calculated using lowest model level |
| T_2m | | Temperature at 2 m | air_temperature | ° C. | |
| theta_2m | | Potential Temperature at 2 m | air_potential_temperature | K | |
| Td_2m | | Dewpoint Temperature at 2 m | dew_point_temperature | ° C. | |

-continued

| CF | CMIP long_name | standard_name | Units | Notes |
|---|---|---|---|---|
| r_v_2m | Water Vapor Mixing Ratio at 2 m | humidity_mixing_ratio | kg kg$^{-1}$ | |
| q_2m | Specific Humidity at 2 m | specific_humidity | kg kg$^{-1}$ | |
| rh_2m | Relative Humidity at 2 m | relative_humidity | % | |
| u_10m_gr | u-Component of Wind at 10 m (and) | eastward_wind | m s$^{-1}$ | |
| v_10m_gr | v-Component of Wind at 10 m (grid) | northward_wind | m s$^{-1}$ | |
| u_10m_tr | u-Component of Wind at 10 m (Earth) | eastward_wind | m s$^{-1}$ | |
| v_10m_tr | v-Componont of Wind at 10 m (Earth) | northward_wind | m s$^{-1}$ | |
| ws_10m | Wind Speed at 10 m | wind_speed | m s$^{-1}$ | |
| wd_10m | Wind Direction at 10 m | wind_from_direction | degree | |
| precip_g | Accumulated Total Grid Scale Precip. | large_scale_precipitation_amount | mm | |
| precip_c | Accumulated Total Cumulus Precip. | convective_precipitation_amount | mm | |
| precip_fr | Fraction of Frozen Non-convective Precipitation | | 1 | Cannot identify a corresponding standard_name. |
| dryairmass | Total Dry Air Mass in Column | | hPa | Cannot identify a corresponding standard_name. |
| pblh | PBL Height | atmosphere_boundary_layer_thickness | m | |
| rho | Air Density at Lowest Model Level | air_density | kg m$^{-3}$ | |

The above database chain can be added with more fields if the user desires. So this system can be used for normal user or for professional users.

Refer to FIG. 2D. Features like alert of high helicity (10K field), with corresponding fields of time and location (01A 02B 03C and 04D) will inform the user the presence of a forecast of a strong storm nearby. The graphical GAR interface will show the user an alert of strong storm or high relative helicity possibility based on the use mode (as the app can be set for common language use or with professional glossary terms).

Special conditions display can be related to a routine to identify in deep field view the low or maximum weather condition of interest, so a comparison logic routine in the app device like "in case first weather variable (05E, 06F, 07G, 08H, 09J or 10K) value of one location 02B, 03C, 04D is > or < than next database location 02B, 03C, 04D variable (05E, 06F, 07G, 08H, 09J or 10K) then select > or < variable as lower or maximum" can be implemented in the device application and when wind, temperature or any other variable of interest reach a minimum or maximum in the display (zone of view), the system can alert to user. It is very interesting to note high wind areas or high temperature areas, or even, mist zone or calm wind zone.

It is important to note that user app can download previously (and only one time) a local altitude topology database field. This feature can be implemented in GAR app in user device in order to join the 04D database field of the weather database with corresponding terrain topology. It will increase the user realistic experience.

Correlation of WRF post-process database and local topology field installed in user device in an environment of Geolocated Augmented Reality is shown.

At step 510, request from user device is received, earth zone is selected based user request and weather forecast information is sent to the user.

Exemplary Process for Implementing an Intelligent Advisor

Figure 6:
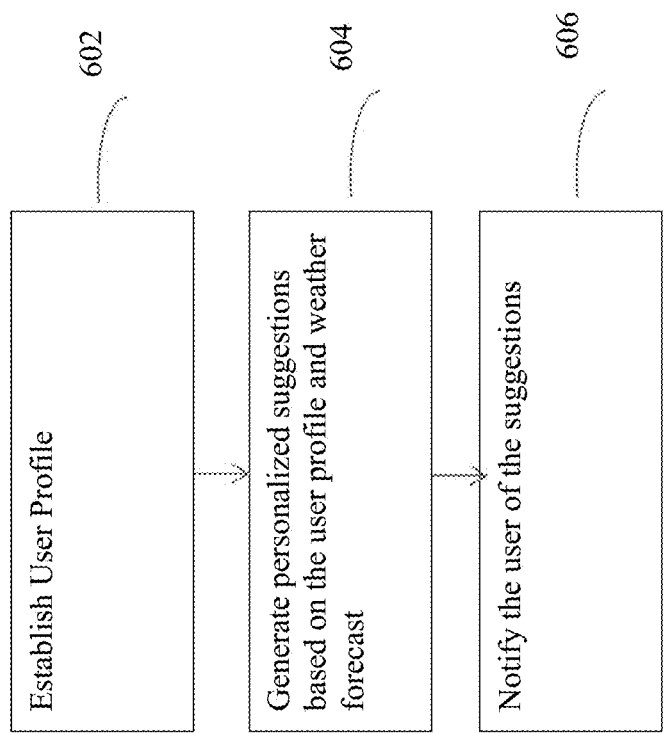
FIG. 6 is an example process for implementing an intelligent advisor.

FIG. 6 is an exemplary process for implementing an intelligent advisor. In one embodiment, the advisor may provide suggestions to the user for where to go for her holidays. The suggestion may be based on the user profile, weather forecast information and other information such as airfares, hotel rates, etc.

At step 602, the user establishes a profile. The user may specify her location—where she lives. This information can be used by the advisor to determine the holidays for the user. For example, if the user lives in the US, then July 4th will be a holiday for the user and the advisor can advise the user where to go on that day.

The user may specify events of interest. For example, the user may specify that she is interested in mountain climbing, biking, etc. Based on such information, the advisor may automatically calculate weather conditions that are suitable for the user's interests. For example, if the user's interests include golfing, that the advisor will calculate that the best weather condition for golf is around 25 degrees, no rain and little or no wind.

The user may specify locations of interest. For example, the user may specify that she is interested in Washington D.C.

The user may also specify personal preferences. Such preferences may include favorite weather conditions, such as between certain temperature ranges. Such preferences may also include her preferences for humidity, accommodations and preferred months to travel during the year.

At step 604, personalized advices are generated. The advices are based on weather forecast information. In some implementations, weather forecast can be obtained from WRF-EMS. The intelligent advisor compares the user profiles and the data obtained from WRF-EMS, finds the optimal situations and generates suggestions. In some implementations, the suggestions are further refined by using other information sources, such as airfares, TripAdvisor, WorldNews, Sports, Events, etc. For example, if multiple events satisfy the user's interests, as well as other constraints such as weather, time, etc., the advisor may further rank the suggestions in order based on criteria such as airfares, hotel rates, etc. Based on the user's actions, for example, which suggestion the user selects, the intelligent advisor may learn and further improve suggestions in the future.

At step 606, the intelligent advisor notifies the user of suggestions. For example, the intelligent advisor suggests the best destinations for her holidays.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending webpages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions.

Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

LIST OF REFERENCES

Reference 1, as it appeared in a blog by C. Dalmo, on the dalmocime website on or about Aug. 10, 2013
Reference 2, "A Post-Processing Utility For Creating CF Compliant NetCDF Files From WRFOUT Files" publication and overview by M. W. Seefeldt on the University of Colorado website on or about Aug. 10, 2013.

What is claimed is:

1. A computerized method for generating Augmented Reality displays, comprising:
   obtaining a location and an orientation of an electronic device;
   obtaining a geolocation responsive to the location and the orientation of the electronic device and a distance;
   obtaining physical phenomena information of the geolocation;
   displaying a high resolution spatial data of the physical phenomena information obtained by overlaying the physical phenomena information to concrete physical characteristics, producing local variances, and
   overlaying the obtained physical phenomena to a view of a physical environment on a display of the electronic device.

2. The method of claim 1, wherein the method generates the physical phenomena information responsive to one or more parameters.

3. The method of claim 2, wherein the one or more parameters further comprises: a time parameter, a distance parameter or a combination thereof.

4. The method of claim 3, wherein the physical phenomena information comprises weather forecast information,
   obtained by applying a nesting approach, starting with a Mother of all Domains (MOAD) of 512 km by 328 km and applying a ratio of size of domains,
   whereby the resulting subdomain is no larger than about 65.6 Km, having a grid spacing ratio to parent of 1/5.

5. The method of claim 4, wherein the method displays a cloud forecast, wind forecast, rain forecast, snow forecast, sun light forecast, temperature forecast, humidity forecast, mist forecast, helicity forecast, relative storm helicity forecast, convective available potential energy forecast, dew point forecast, air pressure forecast, or a combination thereof.

6. The method of claim 5, wherein the method displays a rendering of a cloud forecast and displays a rendering of a cloud.

7. The method of claim 6, wherein the rendering comprises shape of the cloud, location of the cloud, or a combination thereof.

8. The method of claim 4, wherein the method further comprises:
   obtaining weather information corresponding to different areas within the area covered by the location, the orientation of the device and the distance; and
   displaying the weather information at relative positions over the view of the physical environment on the device.

9. The method of claim 3, wherein the physical phenomena information comprises oceanic information.

10. The method of claim 9, wherein the oceanic information comprises current, water temperature, salinity, vorticity, dissolved oxygen, wave height, biomass, phosphate, dynamic depth anomaly, nitrate, or a combination thereof.

11. The method of claim 3, wherein the physical phenomena information comprises geological information.

12. The method of claim 11, wherein the geological information comprises earthquake information, $CO_2$ gas measure, $SO_2$ gas measure, Helium measure, faults information, mineral water prospections information, natural or artificial subterranean galleries and petrol, mineral, mineral fossil deposits prospections information.

13. The method of claim 12, wherein the earthquake information, $CO_2$ gas measure, $SO_2$ gas measure, Helium measure, faults information, mineral water prospections information, natural or artificial subterranean galleries and petrol, mineral, mineral fossil prospections information comprises a location and movement of an earthquake epicenter, location of $CO_2$ gas measure, $SO_2$ gas measure, Helium measure, faults, mineral water prospections, natural or artificial subterranean galleries, and petrol, mineral, mineral fossil deposits, or a combination thereof.

14. The method of claim 3, wherein the physical phenomena information comprises Planetary Science information.

15. A method for weather forecast presented on an Augmented Reality display, comprising:
   receiving weather forecast data based on Global Forecast System;
   applying Weather Research and Forecasting Model-Environmental Modeling System to the received data to specific areas;

obtained by applying a nesting approach, starting with a Mother of all Domains (MOAD) of 512 km by 328 km and applying a ratio of size of domains, whereby the resulting subdomain is no larger than about 65.6 Km, having a grid spacing ratio to parent of 1/5;

the information applied to concrete physical characteristics producing local variances; and generating weather forecast presented at high resolution on the Augmented Reality display precisely overlaid on physical features seen on the Augmented Reality display.

* * * * *